United States Patent
Ammanur et al.

(10) Patent No.: US 10,986,075 B2
(45) Date of Patent: Apr. 20, 2021

(54) DISTRIBUTING PACKETS ACROSS PROCESSING CORES

(71) Applicant: Arista Networks, Inc., Santa Clara, CA (US)

(72) Inventors: Rajagopalan Madapusi Ammanur, Los Altos, CA (US); Sreedhar Ganjikunta, Santa Clara, CA (US); Adhip Gupta, Sunnyvale, CA (US); Chaitanya Lala, Santa Clara, CA (US); Prasanna Panchamukhi, San Ramon, CA (US); Udayakumar Srinivasan, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 92 days.

(21) Appl. No.: 16/177,096

(22) Filed: Oct. 31, 2018

(65) Prior Publication Data
US 2019/0132297 A1 May 2, 2019

Related U.S. Application Data

(60) Provisional application No. 62/580,897, filed on Nov. 2, 2017.

(51) Int. Cl.
*H04L 29/06* (2006.01)
*H04L 9/06* (2006.01)
*H04L 12/46* (2006.01)

(52) U.S. Cl.
CPC ........ *H04L 63/0485* (2013.01); *H04L 9/0643* (2013.01); *H04L 12/4633* (2013.01); *H04L 69/164* (2013.01); *H04L 69/22* (2013.01); *H04L 63/164* (2013.01); *H04L 2212/00* (2013.01)

(58) Field of Classification Search
CPC ............... H04L 63/0485; H04L 69/164; H04L 12/4633; H04L 69/22; H04L 9/0643; H04L 2212/00; H04L 63/164
See application file for complete search history.

(56) References Cited

U.S. PATENT DOCUMENTS 7,380,124 B1 * 5/2008 Mizell ................. H04L 63/0272
380/247
7,606,191 B1 * 10/2009 Breau ................. H04L 12/4641
370/328

(Continued)

*Primary Examiner* — Cheng-Feng Huang
(74) *Attorney, Agent, or Firm* — Haley Guiliano LLP

(57) ABSTRACT

A method for transmitting packets in a network is provided. The method includes determining that a first packet will be encrypted prior to transmitting the first packet to a network device. The first packet includes a first source address for the first packet. The method also includes generating a routing value based on the first source address. The routing value allows the network device to determine which of a plurality of processing cores will be used to process the first packet. The method further includes encrypting the first packet to generate an encrypted first packet. The method further includes encapsulating the encrypted first packet within a second packet. A payload of the second packet comprises the encrypted first packet and a packet header of the second packet includes the routing value. The method further includes transmitting the second packet to the network device.

18 Claims, 7 Drawing Sheets

(56) References Cited

U.S. PATENT DOCUMENTS

| | | | | |
|---|---|---|---|---|
| 7,864,770 | B1* | 1/2011 | Baker | H04L 45/04 370/392 |
| 10,129,144 | B1* | 11/2018 | Singh | H04L 45/66 |
| 2004/0128553 | A1* | 7/2004 | Buer | H04L 63/045 713/154 |
| 2004/0158706 | A1* | 8/2004 | Moritomo | H04L 63/0464 713/153 |
| 2007/0265978 | A1* | 11/2007 | Kahn | G06F 21/10 705/59 |
| 2009/0080460 | A1* | 3/2009 | Kronewitter, III | H04L 47/193 370/466 |
| 2013/0114414 | A1* | 5/2013 | Song | H04L 47/34 370/237 |
| 2013/0297671 | A1* | 11/2013 | Zhu | H04L 47/10 709/201 |
| 2015/0036513 | A1 | 2/2015 | Bukin | |
| 2015/0067819 | A1* | 3/2015 | Shribman | H04L 67/06 726/12 |
| 2016/0182509 | A1 | 6/2016 | Kantecki | |
| 2016/0197836 | A1* | 7/2016 | Hussain | H04L 69/22 713/160 |
| 2017/0063979 | A1 | 3/2017 | Saeki | |
| 2017/0149583 | A1 | 5/2017 | Hira | |
| 2017/0207963 | A1* | 7/2017 | Mehta | H04L 45/54 |
| 2018/0069924 | A1* | 3/2018 | Tumuluru | H04L 63/0272 |
| 2018/0359218 | A1* | 12/2018 | Church | H04L 63/0272 |

\* cited by examiner

DISTRIBUTING PACKETS ACROSS PROCESSING CORES

CROSS-REFERENCE TO RELATED APPLICATIONS

This application claims the benefit of U.S. Provisional Patent Application No. 62/580,897, filed on Nov. 2, 2017. The disclosure of the above-referenced application is hereby incorporated by reference in its entirety.

BACKGROUND

Computing devices (such as smartphones, tablet computers, laptop computers, desktop computers, server computers, etc.) and/or applications communicate data with each other using various networks. For example, computing devices and/or applications may transmit packets, messages, frames, etc., to each other via one or more networks. To increase the security of the data communicated between various computing devices, the data may be transmitted using secure communication channels. Data transmitted using secure communication channels may be encrypted prior to sending the data. Encrypting the data provides protection against malicious users who may not be authorized to access the data and may increase the privacy of the data.

SUMMARY

In some embodiments, a method of transmitting packets in a network, performed by one or more network devices, is provided. The method includes determining that a first packet will be encrypted prior to transmitting the first packet to a network device. The first packet includes a first source address for the first packet. The method also includes generating a routing value based on the first source address. The routing value allows the network device to determine which of a plurality of processing cores will be used to process the first packet. The method further includes encrypting the first packet to generate an encrypted first packet. The method further includes encapsulating the encrypted first packet within a second packet. A payload of the second packet comprises the encrypted first packet and a packet header of the second packet includes the routing value. The method further includes transmitting the second packet to the network device.

In some embodiments, an apparatus for transmitting packets in a network is provided. The apparatus includes a memory configured to store a plurality of packets and a routing component coupled to the memory. The routing component is configured to determine that a first packet will be encrypted prior to transmitting the first packet to a network device. The first packet comprises a first source address for the first packet. The routing component is also configured to generate a routing value based on the first source address. The routing value allows the network device to determine which of a plurality of processing cores will be used to process the first packet. The router component is further configured to encrypt the first packet to generate an encrypted first packet. The router component is further configured to encapsulate the encrypted first packet within a second packet. A payload of the second packet includes the encrypted first packet and a packet header of the second packet includes the routing value. The routing component is further configured to transmit the second packet to the network device.

In some embodiments, a method of receiving packets in a network, performed by one or more network devices, is provided. The method includes receiving a first packet. A first packet header of the first packet includes a routing value, the first packet includes an encrypted second packet, and the routing value is based on a source address of the encrypted second packet. The method also includes identifying a first processing core of a plurality of processing cores based on the routing value. The method further includes providing the first packet to the first processing core.

In some embodiments, an apparatus for receiving packets in a network is provided. The apparatus includes a memory configured to store a plurality of packets and a routing component coupled to the memory. The routing component is configured to receive a first packet. A first packet header of the first packet includes a routing value, the first packet includes an encrypted second packet, and the routing value is based on a source address of the encrypted second packet. The routing component is further configured to identify a first processing core of a plurality of processing cores based on the routing value. The routing component is further configured to provide the first packet to the first processing core.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, computing devices and/or applications communicate data, such as packets, with each other using various networks. Different computing devices and/or applications may have different flows (e.g., groups, sets, streams, etc.) of packets. Using different processing cores to process the packets for different flows may allow the processing of the flows of packets to be parallelized. This parallel processing is often achieved using the source address of the packets. For example, different computing devices may have different source addresses. Providing and/or assigning packets to different processing cores based on the source address may allow different flows to be processed in parallel using multiple processing cores.

However, network devices (such as routers) may encrypt the packets to prevent unauthorized access to the packets (e.g., to prevent unauthorized uses from reading or accessing the packets) and to increase the privacy of the packets. Encrypting the packets may prevent a network device from accessing (e.g., reading) the source address. If the source address is inaccessible, the receiving routing device may use the source address of the encrypted packets to determine which processing core should be used to process the encrypted packets. If all of the encrypted packets are received from one network device (e.g., a transmitting router), the receiving network device may use the same processing core to process the encrypted packets, even though there may be different flows of packets from different computing devices and/or applications. Processing different flows of packets using a single processing core may increase the amount of time to process the packets and may be more inefficient that using than using multiple processing cores. It is within this context that the example, implementations, and embodiments disclosed herein arise.

Figure 1:
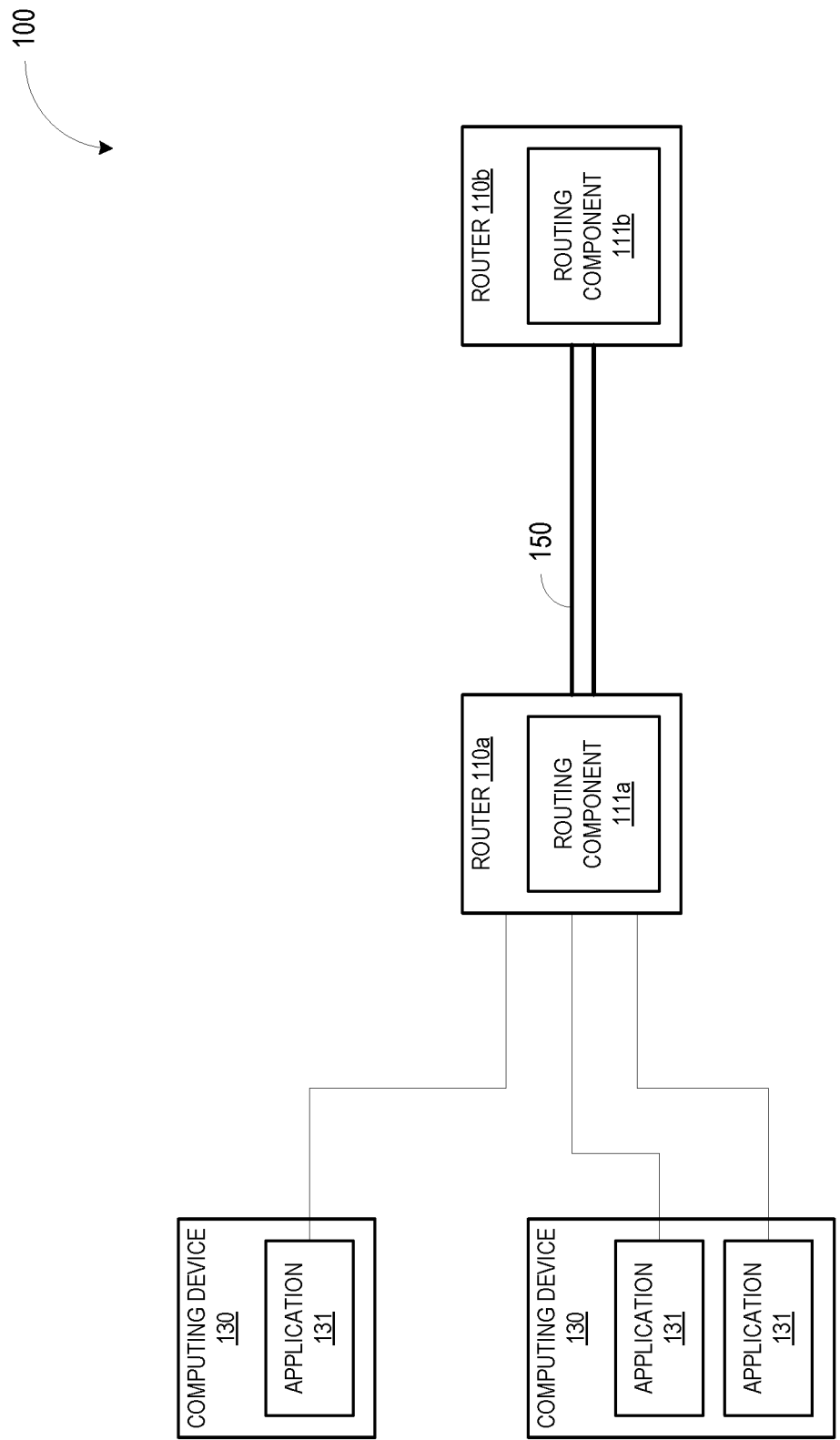
FIG. 1 is a network diagram showing a network architecture in accordance with some embodiments.

FIG. 1 is a network diagram showing a network architecture 100 in accordance with some embodiments. The network architecture 100 includes a router 110a, a router 110b, and computing devices 130. The router 110a includes a routing component 111b and the router 110b includes a routing component 111b. Each computing device 130 includes one or more applications 131. A computing device 130 and/or an application 131 of the computing device 130 may transmit data (e.g., messages, frames, packets, etc.) to other devices (e.g., other computing devices) via routers 110a and 110b, and/or may receive data from other devices via routers 110a and 110b. The computing device 130 may be coupled to the router 110a via one or more networks (not illustrated in FIG. 1). The router 110a may be coupled to the router 110b via a communication channel 150 and the communication channel 150 may traverse (e.g., go through or use) one or more networks (also not illustrated in FIG. 1). A network may be a public network (e.g., the internet), a private network (e.g., a local area network (LAN) or wide area network (WAN)), or a combination thereof. A network may also include a wired or a wireless infrastructure, which may be provided by one or more wireless communications systems, such as a wireless fidelity (WiFi) hotspot connected with the network and/or a wireless carrier system that can be implemented using various data processing equipment, communication towers (e.g. cell towers), etc. A network may also include various network devices such as switches, routers, bridges, gateways, servers computers, cables, chips integrated circuits, etc.

In one embodiment, a computing device 130 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices 130 may comprise any suitable type of computing device or machine that has a programmable processor including, for example, server computers, desktop computers, laptop computers, tablet computers, smartphones, set-top boxes, etc. In some examples, the computing devices 130 may be a single machine or may include multiple interconnected machines (e.g., multiple computers configured in a cluster). In another embodiment, a computing device 130 may be a virtual machine (VM). A VM may be an emulation of a computing device. The VM may execute on a hypervisor which executes on top of an operating system for a host computing device. The hypervisor may manage system sources (e.g., may manage access to hardware devices, such as processors, memories, storage devices, etc., of the host computing device). The hypervisor may also emulate the hardware (or other physical resources) which may be used by the VMs to execute software and/or applications. As illustrated in FIG. 1, each computing device 130 includes one or more applications 131. An application 131 may be a program (e.g., a computer program), software, etc., that may execute on a computing device 130 to perform various functions, tasks, operations, etc. Examples of applications include, but are not limited to, a messaging application, a video application, a social networking application, a video sharing application, a photo sharing application, a chat application, a content (e.g., video, music, etc.) delivery application, a web browser, a media player, a gaming application (e.g., a video game), etc.

As discussed above, the computing devices 130 and/or the applications 131 may transmit packets to and/or receive packets from other devices via the routers 110a and router 110b. The router 110a may transmit data to and/or receive data from the router 110b via a communication channel 150. In one embodiment, the communication channel 150 may be an encrypted communication channel. An encrypted communication channel may be a channel where portions or all of the data (e.g., portions or all of the messages, packets, frames, etc.) that are transmitted/received via the channel, are encrypted. An encrypted communication channel may also be referred to as a secure communication channel. Encrypting portions or all of the data (e.g., packets) communicated via the communication channel 150 may increase or improve the security of the communication channel. Examples of encrypted communication channels include, but are not limited to, Internet Protocol Security (IPsec) channels, Transport Layer Security (TLS) channels, Secure Shell (SSH) channels, Virtual Private Network (VPN) channels, etc.

A packet (or message, frame, etc.) may include multiple portions. For example, a packet may include a packet header (also referred to as a header), a packet footer (also referred to as a footer) and a payload. The packet header may include information such as a source address and a destination address. A source address may be data (e.g., a value, a number, etc.) that may indicate the sender of the packet. For example, a source address may be an Internet Protocol (IP) address of a computing device 130 that transmitted the packet. A destination address may be data (e.g., a value, a number, etc.) that may indicate a recipient of the packet. For example, a destination address may be an Internet Protocol (IP) address of a receiving computing device. The packet header may also include information such as a source port and a destination port.

In one embodiment, a network device (such as a router or a switch) may include multiple processing cores or may have access to multiple processing cores (e.g., may be able to use multiple processing cores for processing packets). A processing core may refer to separate processing devices (e.g., separate central processing units (CPUs), separate processors, etc.) or may refer to a single core of a processing device that has multiple cores (e.g., a single core of a multi-core CPU). It may be beneficial for the network device to use multiple processing cores for processing packets rather than a single processing core. For example, if flows (e.g., groups, streams, sets, etc.) of packets are received from each of the three applications 131 illustrated in FIG. 1, the network device would be able to process the different flows of packets more quickly if a different processing core was used to process each flow of packets. This may allow the network device to process the three flows of packets simultaneously using three different processing cores (which decreases the amount of time it takes the networking device to process the three flows of packets). This may also allow the network device to parallelize the processing of the flows of packets. Various techniques such as receive side scaling (RSS) and receive packet steering (RPS) may be used to distribute packets (received by a networking device) to different processors and/or processing cores. Generally, these techniques (e.g., RSS, RPS, etc.) use the source address of packets to determine how to distribute the packets among the different processors and/or processing cores.

As discussed above, portions or all of a packet (or message, frame, etc.) transmitted via the communication channel 150 may be encrypted to increase the security of the communication channel 150. For example, if the communication channel 150 is an IPsec channel, the IP packets (e.g., header, payload, and footer) that are transmitted using the IPsec channel may be encrypted to generate IPsec packets (e.g., to generate encrypted packets). The router 110a may encrypt the IP packet (to generate the IPsec packets) and may send the IPsec packets to the router 110b via the communication channel 150. The IPsec packet may also include its own header, footer, and payload. The payload of the IPsec packet may be the encrypted IP packet. The header of the IPsec packet may also include a source address that indicates the sender of the IPsec packet. For example, the IPsec packet may indicate that the IPsec packet is from the router 110a by including the IP address of the router 110a in the source address of the IPsec packet.

As discussed above, a packet may be encrypted by the router 110a to generate an encrypted packet. The packet may include a first header with a first source address and the encrypted packet may include a second header with a second source address identifying the router 110a (e.g., an IP address of the router 110a). Encrypting the packet and/or the packet header may prevent router 110b from reading the first source address that is in the packet header because the first source address is encrypted when the packet or packet header is encrypted. If the router 110b is unable to read the first source address of the packets, the router 110b may be unable to determine which processing core should be used to process the packets based on the first source address (and thus may be unable to use techniques such as RSS and/or RPS). Instead, the router 110b may use the second source address of the encrypted packet. However, because all of the encrypted packets may be encrypted by router 110a, the encrypted packets will include the same second source address (e.g., the IP address of the router 110a). This may cause the router 110b to provide, route, forward, etc., all of the encrypted packets (generated by the router 110a) to the same processing core. Routing the encrypted packets to the same processing core (rather than multiple processing cores) will increase the amount of time for the router 110b to process the encrypted packets (e.g., decrypt the encrypted packets, determine where the unencrypted packets should be forwarded to, etc.).

In one embodiment, the routing component 111b (of the router 110a) may encapsulate the encrypted packets within another packet, which may be referred to as an outer packet or an encapsulating packet. The packet header of the outer/encapsulating packet may include a routing value based on the source address (and/or other fields/values such as the source port, the destination address, the destination port, the payload, etc.) of the unencrypted packet (e.g., the packet that was encrypted to generate the encrypted packet). For example, the packet header may include a source port and the source port may include the routing value. The routing value may be determined (e.g., generated, calculated, etc.) by the routing component 111b. For example, the routing value may be a hash (e.g., a hash value) generated based on the source address of the unencrypted packet. As discussed above, the source address of the unencrypted packet may (which would allow the router 110b to assign different flows of packets to different processing cores, based on the source addresses) may not usable because the source address may be encrypted when the unencrypted packet is encrypted by the router 110a. However, because the source port of the encapsulating packet is a routing value based on the source address of the unencrypted packet, this may allow the router 110b to assign the different flows of packets to different processing cores based on the source port, as discussed in more detail below. Although the present disclosure may refer to a source port, other fields, parameters and/or values in the packet headers may be used to store the routing value in other embodiments. In addition, other portions of the unencrypted packet may be used to determine, generate, calculate, etc., the routing value in other embodiments. For example one or more of the source address, the source port, the destination address, the destination port, and the payload (or portions of the payload) of the unencrypted packet may be used to generate the routing value.

In one embodiment, the router 111b (of the router 110b) may receive an encapsulating packet (e.g., outer packet) generated by the router 110a and may determine which processing core should be used to process the encapsulating packet (and the encrypted packet within the encapsulating packet) based on the source port of the encapsulating packet. As discussed above, the source port of the encapsulating packet may be a routing value based on the source address of the encrypted packet within the encapsulating packet.

The examples, implementations, and/or embodiments described herein allow different flows (e.g., different groups, sets, etc.) of packets to be distributed to multiple processing cores to parallelize the processing of the different flows. The routing values allow different flows of packets to be distributed to different processing cores (for parallel processing) even though the packets may be encrypted. By generating the routing values based on the headers of the unencrypted packets (e.g., the inner headers) before the unencrypted packets are encrypted, the routers and/or routing components are able to distribute different flows of packets to different processing cores. This may decrease the amount of time to process the packets received by a router. This may also increase the speed with which the router is able to process packets that are received. This may further increase the efficiency of the router when processing packets (because the packets may be processed in parallel by multiple processing cores).

Although the present disclosure may refer to IPsec, IPsec packets, IPsec channels, etc., other embodiments may use other secure communication channels and other types of packets. For example, TLS channels/connections, virtual private network (VPN) channels/connections, virtual extensible LAN (VXLAN) channels/connections, etc., may be used. In addition, although while the present disclosure may refer to and/or illustrate routers, the embodiments are not meant to be limiting as other types of network devices such as a switch, a gateway, a bridge, etc., may perform the methods, functions, operations, etc., described herein. Furthermore although two computing devices 130 and three applications 131 are illustrated in FIG. 1, it shall be understood that in other embodiments, any number of computing devices and/or applications may be used in the network architecture 100.

Figure 2:
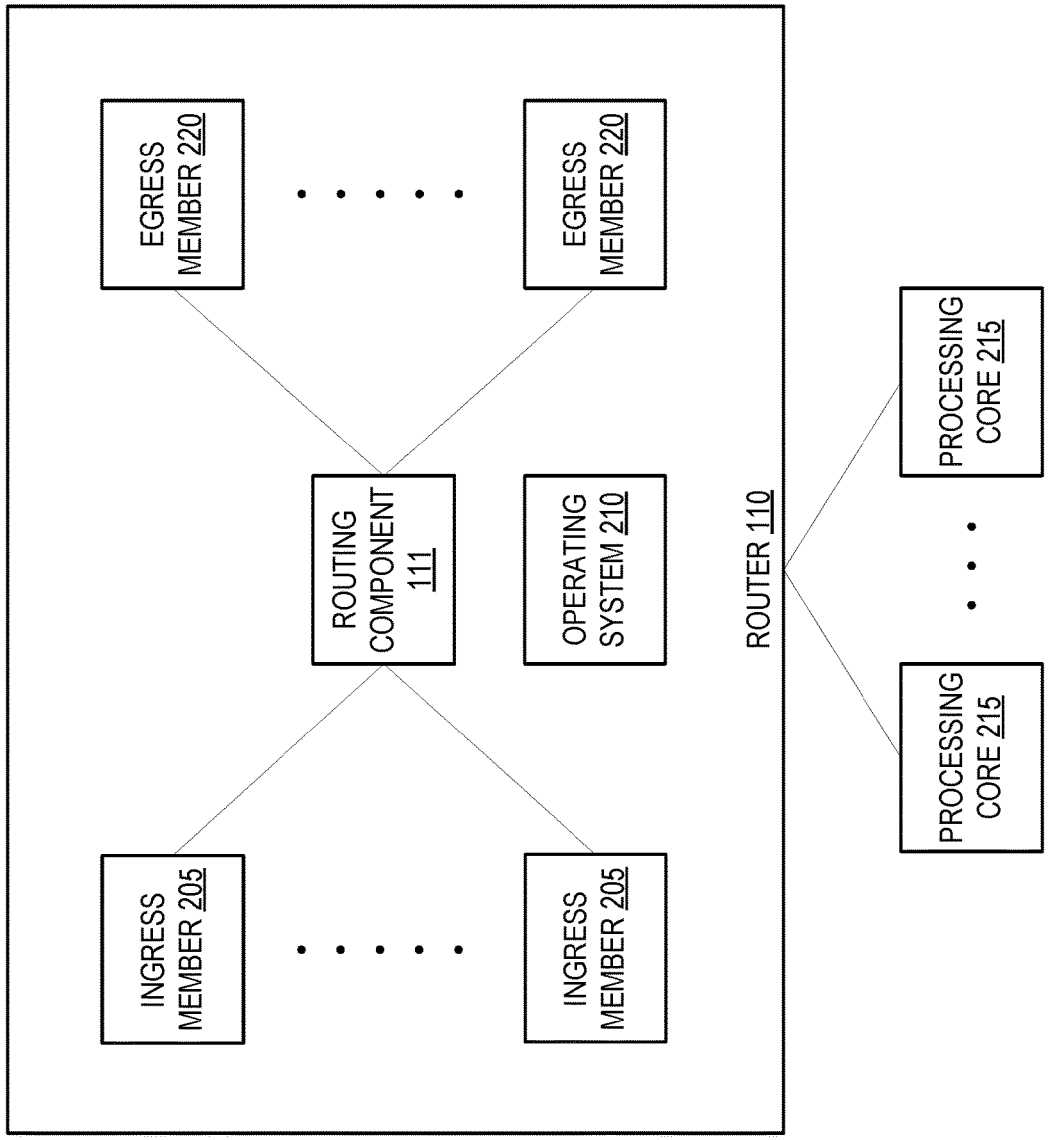
FIG. 2 is a system diagram of a router in accordance with some embodiments.

FIG. 2 is a system diagram of a router 110 in accordance with some embodiments. The router 110 includes ingress members 205, egress members 220, processing cores 215, and a routing component 111. The router 110 may represent router 110a and/or router 110b illustrated in FIG. 1, but could also represent other routers. In one embodiment, the router 110 may receive a packet (e.g., an IP packet, an unencrypted packet, etc.) from a computing device (e.g., computing device 130 illustrated in FIG. 1) and/or an application (e.g., application 131 illustrated in FIG. 1) via an ingress member 205. The ingress member 205 may provide the packet to the routing component 111 (e.g., a fabric chip). The routing component 111 may process the packet (e.g., may encrypt the packet, may encapsulate the encrypted packet, etc., as discussed in more detail below), and may route or forward the packet toward one of the egress members 220. The egress members 220 may transmit the packet to a next hop (e.g., another computing device, another network, another network device, etc.).

In some embodiments, the router 110 may also optionally include an operating system 210. For example, the router 110 may include a LINUX operating system. The routing component 111 may work in conjunction with the operating system 210. For example the routing component 111 may work in conjunction with the operating system 210 when transmitting packets, receiving packets, encrypted packets, etc., ad discussed in more detail below. Although the routing component 111 is illustrated as separate from the operating system 210, the routing component 111 may be part of the operating system 210 in other embodiments. In further embodiments, the router 110 may not include an operating system 210 and the routing component 111 may encrypt packets, encapsulate packet, etc.

In one embodiment, the router 110 (e.g., router 110a illustrated in FIG. 1) may transmit packets to another router (e.g., router 110b illustrated in FIG. 1) using an encrypted (e.g., secure) communication channel (e.g., an IPsec channel). For example, the router 110 may receive an unencrypted packet (from a computing device and/or an application) via an ingress member 205. The routing component 111 may encrypt the unencrypted packet (received via the ingress member 205). Transmitting the encrypted packets may prevent a network device that receives the encrypted packets (e.g., a receiving router, a receiving network device) from assigning the encrypted packets to different processing cores because the source address of the unencrypted packets (received via the ingress members 205) are encrypted by the router 110.

In one embodiment, the routing component 111 may determine that a first packet (e.g., an unencrypted packet) will be encrypted prior to transmitting the first packet to a network device. For example, the routing component 111 may determine that the first packet will be transmitted to another network device (e.g., another router) via an encrypted communicant channel. The first packet may include a first header and the first header may include a first source address (e.g., a source address that indicates the computing device and/or application that transmitted the packet to the router 110).

In one embodiment, the routing component 111 may generate a routing value based on the first source address. The routing value may be a hash or hash value generated using a hashing function/algorithm. For example, the routing value may be a 16-bit hash value determined (e.g., generated, computed, etc.) by providing the first source address (or portions of the first source address) as an input to a hashing function. In other embodiments, the routing component 111 may generate the routing value based on one or more of the source address, the source port, the destination address, the destination port, and the payload of the first packet. The routing value may allow another network device (e.g., a receiving network device, a receiving router) to determine which of a plurality of processing cores should be used to process the first packet (and/or the second packet, as discussed in more detail below).

In one embodiment, the routing component 111 may encrypt the first packet to generate an encrypted first packet. For example, the routing component 111 may encrypt an IP packet to generate an IPsec packet. As discussed, each encrypted packet may have a respective source address that may indicate that the encrypted packet is transmitted from the router 111. In addition, the source address of the first packet may not be readable and/or accessible because the source address is encrypted along with the first packet. If the source address of the first packet is not readable or accessible, the receiving network device may not be able to determine which processing core should be used to process the packet. Instead, the receiving network device (e.g., a receiving router) may use the source address of the encrypted packet which may cause all of the encrypted packet to be routed/provided to the same processing core because all of the encrypted packet may have the same source address (e.g., the IP address of the router 110 that transmitted the encrypted packet).

In one embodiment, the routing component 111 may encapsulate the encrypted first packet within a second packet. For example, the routing component 111 may create a second packet (e.g., an outer packet, an encapsulating packet) by adding packet headers and/or packet footers and by including the encrypted first packet as the payload of the second packet. The second packet may include a second header which includes a source port. The source port (of the second header) may include the routing value. For example, the value of the source port (of the second header) may be set to the routing value. The routing component 111 may transmit the second packet (e.g., the outer/encapsulating packet) to a network device (e.g., to another router). In one embodiment, the source port of the second packet may have a default value when the second packet is created. For example, if the second packet is a User Datagram Protocol (UDP) packet, the default value of the source port may be 4500. The routing component 111 may replace and/or change the default value of the source port to the routing value (e.g., to the hash generated based on the one or more of the source address, the source port, the destination address, the destination port, and the payload of the first packet). In some embodiments, the encrypted first packet may be generated by encrypting the original first packet and adding packet headers/footers, and the second packet may be generated by adding headers/footers to the encrypted first packet. In other embodiments, the second packet may be generated by creating a copy of the encrypted first packet and adding the headers/footers to the copy of the encrypted first packet.

In one embodiment, a network device that receives the outer/encapsulating packets transmitted by the router 110 may be able to process and/or forward packets more quickly. The source address of the outer/encapsulating packet may include a routing value based on the source address (and/or other fields/values such as the source port, the destination address, the destination port, the payload, etc.) of the unencrypted packet (e.g., the packet that was encrypted to generate the encrypted packet). For example, the routing value may be a hash (e.g., a hash value) generated based on the source address of the unencrypted packet. As discussed above, the source address of the unencrypted packet may (which would allow the router 110b to assign different flows of packets to different processing cores, based on the source addresses) may not usable because the source address may be encrypted when the unencrypted packet is encrypted by the router 110. However, because the source address of the encapsulating packet is a routing value based on the source address of the unencrypted packet, this may allow the router 110 to assign the different flows of packets to different processing cores, as discussed in more detail below.

In one embodiment, the routing component 111 may determine whether a routing value should be generated and/or whether the encrypted packet should be encapsulated in the second packet (e.g., the outer/encapsulating packet). For example, the routing component 111 may access a configuration setting (e.g., a setting or parameter in a configuration file) or may receive user input (e.g., user input from a network administration) indicating whether packets should be encapsulated and routing values should be generate. If the routing value should be generated and/or the encrypted packet should be encapsulated, the routing component 111 may generate the routing value, encapsulate the packet, etc., as discussed above. If the routing value should not be generated and/or the encrypted packet should be not be encapsulated, the routing component 111 may transmit the encrypted packet (without generating a routing value and/or without encapsulating the encrypted packet) via an egress member.

As discussed above, the routing component 111 may operate in conjunction with the operating system 210 (and/or modules of the operating system 210) to transmit packets to other network devices (e.g., to other routers). In one embodiment, the operating system 210 may encrypt the unencrypted packets (received via the ingress members 205) to generate encrypted packets, and may encapsulate the encrypted packets within an outer/encapsulating packets. For example, the routing component 111 may provide the unencrypted packets to the operating system 210 and the operating system 210 may encrypt the unencrypted packets (to generate encrypted packets) and may encapsulate the encrypted packets in outer/encapsulating packets. The routing component 111 may change and/or replace the source port of the outer/encapsulating packets (as discussed above) and may transmit the outer/encapsulating packets to the receiving network devices, as discussed in more detail below. This may allow the routing component 111 to operate with existing operating systems that may be used in various network devices (and/or computing devices). For example, the routing component 111 may interact with a Linux operating system and/or an XFRM module of a Linux Operating system (e.g., the XFRM module may encrypt and/or decrypt packets), as discussed in more detail below.

In one embodiment, the router 110 (e.g., router 110b illustrated in FIG. 1) may receive packets from another router (e.g., router 110a illustrated in FIG. 1) using an encrypted (e.g., secure) communication channel (e.g., an IPsec channel). For example, the router 110 may receive an encapsulating packet (e.g., an outer packet that includes an encrypted packet) from another router via the encrypted communication channel and an ingress member 205. The encapsulating packet may include an encrypted packet (e.g., an IPsec packet) in the payload of the encapsulating packet, as discussed above. The encapsulating packet may also include a packet header that includes a source port, as discussed above. The source port may include a routing value that is based on a source address of the encrypted packet, as discussed above. For example, the routing value may be a hash value (generated using a hashing function/algorithm) based on the source address (and/or other fields/values such as the source port, the destination address, the destination port, the payload, etc.) of the encrypted packet before the encrypted packet was encrypted.

In one embodiment, the routing component 111 may identify one of the processing cores 215 to process the encapsulating packet and/or the encrypted packet within the encapsulating packet, based on the routing value. For example, the routing component 111 may analyze the routing values, and may apply a function or operation to the routing values. The function and/or operation may map different routing values to different processing cores 215. In another example, the routing component 111 may route the encapsulating packets to different processing cores based on portions of the routing values (e.g., based on the first half of the routing value, based on the last few bytes of the routing value, etc.).

As discussed above, the source address of an unencrypted packet is encrypted along with the unencrypted packet to generate and/or obtain the encrypted packet. For example, the source address of the unencrypted packet is encrypted as part of the encrypted packet. Encrypting the unencrypted packet may generally prevent a router from assigning and/or distributing the encrypted packets to different processing cores (e.g., processing cores 215) because the source address of the unencrypted packets (received via the ingress members 205 are encrypted when the encrypted packet is generated, as discussed above. When encrypted packets are received from a networking device (e.g., another router), the router 110 may generally use the source address of the network device and/or the encrypted packet to determine which processing core 215 will process the encrypted packets and/or the encapsulating/outer packets. This may cause all of the encrypted packets (received from the other router) to be processed by the same processing core 215 because the source address will be the same for all of the encrypted packets (e.g., the source address may be source address of the other router, for all of the encrypted packets). The examples, implementations, and/or embodiments described herein allow the encrypted packets to be provided to different processing cores based on the routing value. Because the routing value (of the encapsulating packet) is based on the source address (and/or other fields/values such as the source port, the destination address, the destination port, the payload, etc.) of the unencrypted packet before it is encrypted (to generate the encrypted packet that is in the payload of the encapsulating packet), the routing component 111 is able to distribute encapsulating packets among the different processing cores 215. This may allow the encapsulating packets and/or encrypted packets to be processed more quickly and/or more efficiently. For example, it may be more efficient to have one processing core 215 process different flows (e.g., different sets, groups, etc.) of encrypted packets received from each computing device and/or application as this will increase the number of encrypted packets that may be processed simultaneously (e.g., one processing core 215 per computing device and/or application).

As discussed above, another router (e.g., another router component of another router) may have replaced a default value for the source port of the encapsulating packet with the routing value. In one embodiment, the routing component 111 may replace the routing value with the default value for the source port (e.g., may set the source port back to the default value). For example, if the encapsulating packet is a Generic Routing Encapsulation (GRE) packet or a User Datagram Protocol (UDP) packet, the routing component 111 may set the source port back to the default value of 4500.

In one embodiment, a processing core 215 (which was identified, selected, etc., by the routing component 111 based on the routing value) may decapsulate an encrypted packet from an encapsulating packet (e.g., from an outer packet). For example, the processing core 215 may remove the packets headers and/or packet footers of the encapsulating packet that included the encrypted packet in the payload. The processing core 215 may also decrypt the encrypted packet to obtain (e.g., to generate) an unencrypted packet. The processing core 215 may transmit (e.g., forward, route, etc.) the unencrypted packet to another network device and/or computing device. For example, the processing core 215 may transmit the unencrypted packet to the next hop or may deliver the unencrypted packet to a network/computing device on a local network (e.g., on a LAN).

As discussed above, the routing component 111 may operate in conjunction with the operating system 210 (and/or modules of the operating system 210) to receive packets from other network devices (e.g., from other routers). In one embodiment, the operating system 210 may decapsulate the encrypted packets from the encapsulating packets (e.g., from the outer packets). The operating system 210 may also decrypt the encrypted packets to obtain (e.g., to generate) unencrypted packets. For example, the routing component 111 may provide the encapsulating packets to the operating system 210 and the operating system 210 may encapsulate the encapsulating packets and may decrypt the encrypted packets. This may allow the routing component 111 to operate with existing operating systems that may be used in various network devices (and/or computing devices). For example, the routing component 111 may interact with a Linux operating system and/or an XFRM module of a Linux Operating system (e.g., the XFRM module may decapsulate and/or decrypt packets), as discussed in more detail below. In another example, the routing component 111 may use existing operating modules (that implement techniques such as receive side scaling (RSS) and receive packet steering (RPS)) to distribute packets to different processors and/or processing cores.

In one embodiment, the routing component 111 may determine whether a received packet is an encapsulating packet. For example, the routing component 111 may analyze the packets (e.g., the packets headers) to determine whether the packet is a UDP packet, an IPsec packet, etc. If the packet is an encapsulating packet, the routing component may identify a processing core 215 from the multiple processing cores 215 based on the routing value (in the source port) of the encapsulating packet, as discussed above. If the packet is not an encapsulating packet, the routing component may identify a processing core 215 from the multiple processing cores 215 based on the source address of the packet. For example, if the packet is an IPsec packet, the routing component 111 may identify a processing core 215 based on the source address of the IPsec packet.

As discussed above, the routers may transmit and/or receive data (e.g., packets, messages, frames, etc.) via an IPsec communication channel (e.g., a secure communication channel). IPsec may work or operate in conjunction with Network Address Translation-Traversal (NAT-T) to transmit and/or receive packets between devices that may be behind an NAT device. NAT-T may encapsulate encrypted packets (e.g., IPsec packets) within UDP packets. NAT devices may modify the headers of the UDP packets (which encapsulate the IPsec packets) which allows NAT devices to forward the UDP packets to the correct network/computing device. In one embodiment, the routers may use NAT-T to transmit and/or receive packets, even though routers may not be behind a NAT device. This may allow the routers to encapsulate the encrypted packets (e.g., the IPsec packets) within a UDP packet (e.g., an encapsulating/outer packet). Encapsulating the encrypted packets within a UDP packet may allow the routers and/or routing components to generate a routing value for the source port and to provide the encrypted packets to different processing cores (based on the routing value), as discussed above.

In one embodiment, the router 110 may be a software router that is located within a cloud system (e.g., a cloud computing/storage system) and/or a data center (e.g., a facility that houses computing devices, storage devices, and/or network devices). For example, the router 110 may be a virtual machine (e.g., a VM) that is executing on a server computer within a data center. In another example, the router 110 may be a container that is executing on a server computer within a data center. As illustrated in FIG. 2, the processing cores may be separate from the router 100. For example, one or more server computers may execute a hypervisor and the router (e.g., a VM) may operate in conjunction with the hypervisors. The processing cores may be the processing devices and/or cores of multi-core processing devices of those or other server computers. Although the processing cores 215 are illustrated as separate from the router 110, the processing cores 215 may part of the router 110 in other embodiments. For example, the router 110 may be a physical device and may include one or more physical processing cores (e.g., one or more multi-core CPUs).

In one embodiment, the cloud system and/or data center (where the router 110 may be located) may use a leaf-spine architecture. A leaf-spine architecture may have two layers of devices, a spine layer and a leaf layer. The leaf layer may include network devices that provide connectivity to the endpoints of a network. For example, the leaf layer may include routers, switches, etc., that may be coupled to load balancers, firewalls, edge routers, servers, etc. The spine layer may include network devices provide connectivity between the devices in the leaf layer. Each network device in the leaf layer may be connected to every network device in the spine layer. The leaf-spine architecture may use equal-cost multi-path routing (ECMP) to determine how to forward packets between the network devices of the leaf layer. For example, ECMP may be used to (more evenly) distribute packets among the different network devices of the spine layer when one network device of the leaf layer is transmitting packets to another network device of the leaf layer. If a secure communication channel is used between the network devices of the leaf layer and the spine layer, the packets from a network device of the leaf layer may always be forwarded to the same network device from the spine layer because the source addresses of the unencrypted packets are not accessible. This would prevent the leaf-spine architecture from using ECMP. However, the examples, implementations, and/or embodiments disclosed herein may use routing values (based on the source addresses and/or other fields/values such as the source port, the destination address, the destination port, the payload, etc., of the unencrypted packets) to route the encapsulating packets to different network devices of the spine layer. This would allow ECMP to distribute among the different network devices of the spine layer based on the routing value.

In some embodiments, each of the routing component 111, the ingress members 205, and the egress members 220 can be implemented as hardware, firmware, one or more processing cores 215 executing software, or combinations thereof. In some embodiments, each ingress member 205, egress member 220, and processing core 215 may be a chip or integrated circuit, although it is readily envisioned that these could be implemented with a greater number of integrated circuits, or combined in a lesser number of integrated circuits or even a single system on chip (SOC) integrated circuit. The term routing is used herein in the general sense of directing a packet towards a destination based on a lookup table with or without any header modifications, and does not necessarily imply a specific L3 (layer three) lookup involving a header rewrite.

In some embodiments, the examples, implementations, and/or embodiments described herein allow different flows (e.g., different groups, sets, etc.) of packets to be distributed among the processing cores 215 so that the processing of the different flows of packets may be parallelized. By generating the routing values based on the headers of the unencrypted packets (e.g., the inner headers) before the unencrypted packets are encrypted, the routers and/or routing components are able to distribute different flows of packets to different processing cores 215. For example, the routing values for a first flow of encapsulating packets (which include encrypted packets) transmitted by a first computing device may be different than the routing values for a second flow of encapsulating packets (which include encrypted packets) transmitted by a second computing device. This may allow the first flow of encapsulating packets to be provided to a first processing core 215 and the second flow of encapsulating packets to a second processing core 215 (rather than providing both the first flow and the second flow of encapsulating packets to the same processing core), which decreases the amount of time to process the first flow and the second flow of encapsulating packets. In addition, the order of the packets within the flows may be maintained/preserved because each packet in a flow of packets (from a computing device and/or an application) may be provided to the same processing core 215.

Figure 3:
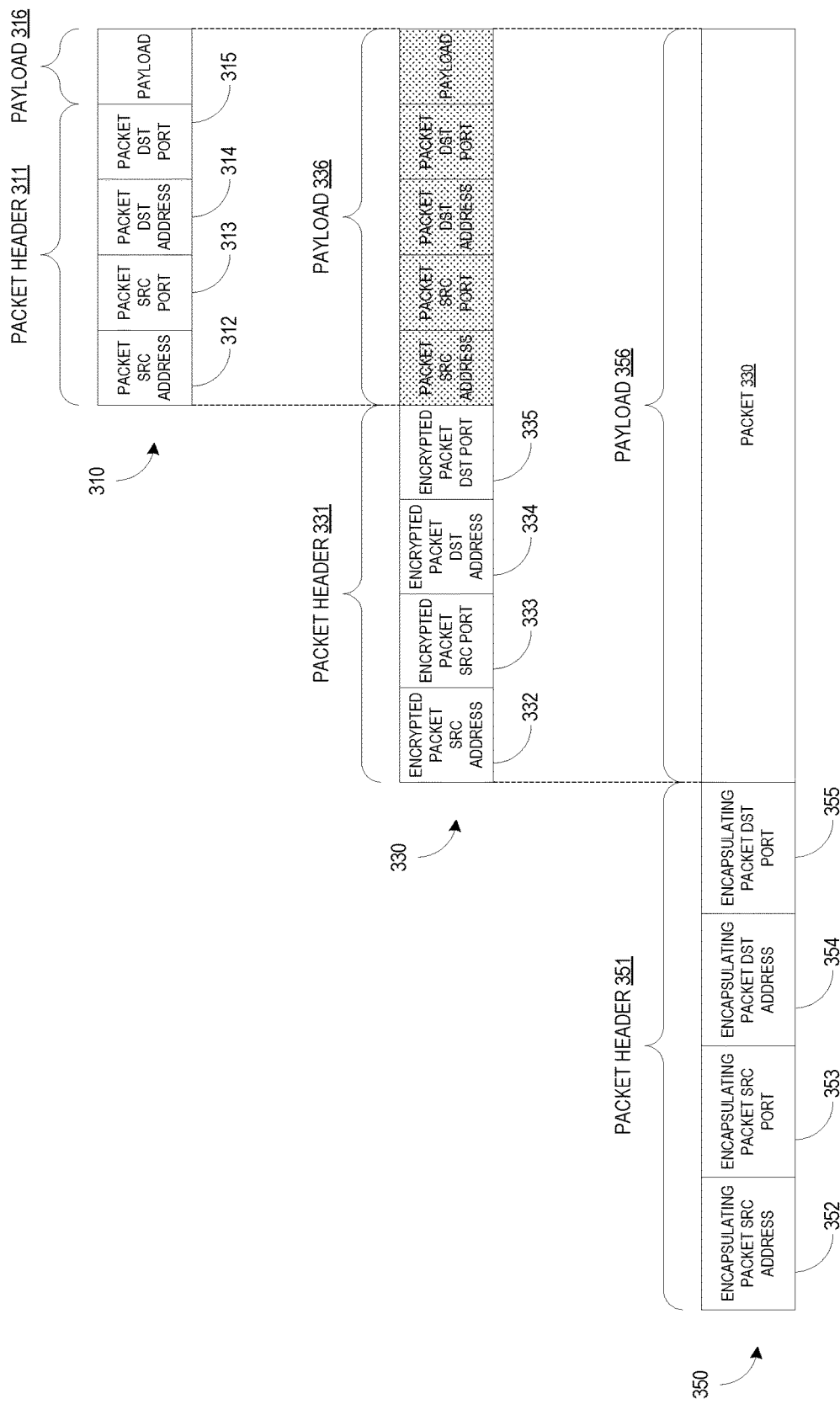
FIG. 3 is a block diagram showing example packets in accordance with some embodiments.

FIG. 3 is a block diagram showing example packets 310, 330, and 350 in accordance with some embodiments. Each of the packets 310, 330, and 350 includes a respective packet header and a payload. The packets 310, 330, and 350 may also include packet footers (not illustrated in the figures) in other embodiments.

In one embodiment, packet 310 may be an unencrypted packet. For example, packet 310 may be an IP packet. Packet 310 includes a packet header 311 and a payload 316. The packer header 311 includes a packet source (SRC) address 312, an optional packet source port 313, a packet destination (DST) address, and an optional packet destination port. As discussed above, different flows of packets (from different computing devices and/or network devices) may have different source addresses.

In one embodiment, packet 330 may be an encrypted packet. For example, packet 330 may be an IPsec packet. The packet 330 may be generated based on the packet 310. For example, the packet 330 may be generated by encrypting the packet 330 (e.g., by encrypting the packet header 311 and the payload 316). As discussed above, it may be useful to use the packet source address 312 to determine which processing core of a receiving network device will be used to process the packet 330 and/or the packet 350. However, because the packet source address 312 is encrypted as part of the packet 330, the packet source address 412 may not be accessible (e.g., may not be usable or readable because it is encrypted), as discussed above. Packet 330 includes a packet header 331 and a payload 336. The packet header 331 includes an encrypted packet source address 332, an optional encrypted packet source port 333, an encrypted packet destination address 334, and an optional encrypted packet destination port 335. The payload 336 is the packet 310 after it has been encrypted (as illustrated by the shading in the payload 336).

In one embodiment, packet 350 may be an encapsulating packet or an outer packet. Packet 350 includes a packet header 351 and a payload 356. The payload 356 may include the packet 330, which in turn includes the packet 310 after it has been encrypted, and the packet header 331 (which may not be encrypted). Packet header 351 includes an encapsulating packet source address 352, an encapsulating packet source port 353, an encapsulating packet destination address 354, and an encapsulating packet destination port 355. As discussed above, the encapsulating packet source port 353 may have a default value when the encapsulating packet 350 is generated (e.g., created, constructed, etc.). A routing component may change the default value to a routing value that is generated based on the packet source address 312. The routing value may be generated before the packet 310 is encrypted (to generate packet 330). As discussed above, the routing value may allow a network device (e.g., a router) that receives the packet 350 to determine which processing core of a plurality of processing cores should be used to process the packet 350 and/or the packet 330, as discussed above. For example, the routing value may map to a first processing core and the first processing core may be used to decapsulate the packet 350 (to obtain the packet 330) and decrypt the packet 330 (to obtain the packet 310). In one embodiment, the routing component (of a receiving router) may also change the encapsulating packet source port 353 back to the default value, as discussed above. In one embodiment, the packet 350 may be generated by adding the packet header 351 (and/or packet footers, not illustrated in FIG. 3) to the packet 330. In another embodiment, the packet 350 may be generated by creating a copy of the packet 350 and adding the packet header 351 (and/or packet footers, not illustrated in FIG. 3) to the copy of the packet 330.

Figure 4:
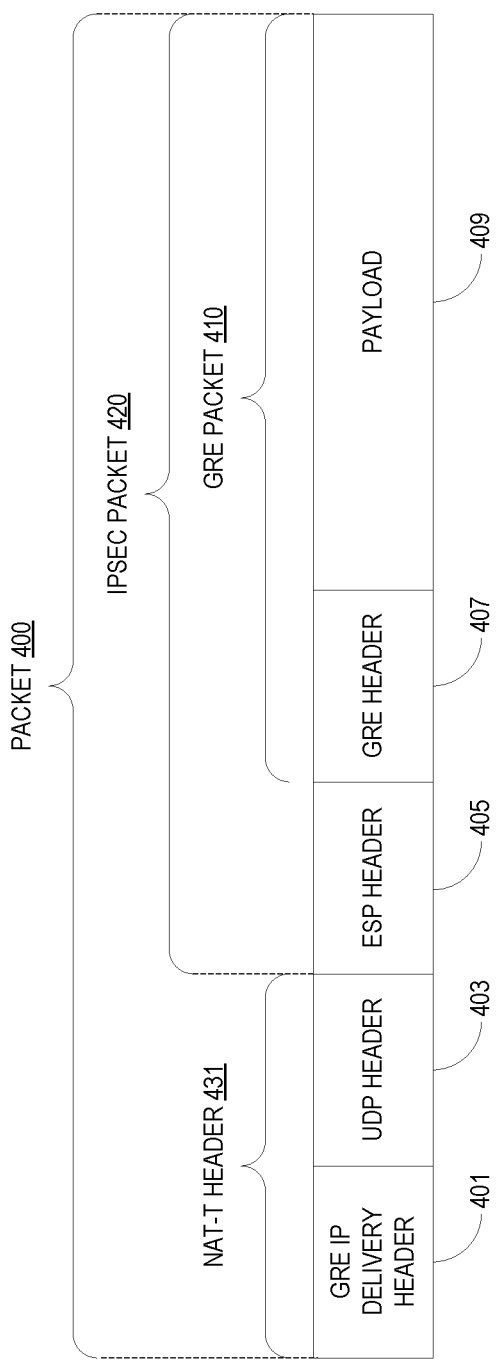
FIG. 4 is a block diagram showing an example packet in accordance with some embodiments.

FIG. 4 is a block diagram showing an example packet 400 in accordance with some embodiments. The packet 400 includes a GRE IP delivery header 401, a UDP header 403, an encapsulating security payload (ESP) header 405, a GRE header 407, and a payload 409. In one embodiment, the packet 400 may be an encapsulating packet or an outer packet.

The payload 409 may be the original data of the IP packet that is transmitted by a computing device and/or application (e.g., video data, image data, text, etc.). The IP packet may be transmitted using a GRE tunnel and the GRE header 407 may be added to the IP packet to transmit the IP packet via the GRE tunnel. For example, the IP packet may be encapsulated within a GRE packet 410.

The GRE packet 410 may use an IPsec communication channel (e.g., a secure communication channel). The GRE packet 410 may be encrypted (e.g., the GRE header 407 and the payload 409) and the ESP header 405 may be added to generate an IPsec packet 420.

The IPsec packet 420 may be encapsulated in an encapsulating packet or an outer packet (such as a UDP packet) to generate packet 400. When the IPsec packet 420 is encapsulated, the GRE IP delivery header 401 and the UDP header may be added. The GRE IP delivery header 401 and the UDP header may be used for NAT-T by the routers (and/or routing components) that transmit and/or receive the packet 400. The combination of the GRE IP delivery header 401 and the UDP header may be referred to as a NAT-T header 431. As discussed above, the routers that transmit and/or receive the packet 400 may use NAT-T even though the routers are not behind an NAT device. This allows the routes to encapsulate other packets (e.g., IPsec packet 420) within packet 400 (e.g., an encapsulating packet, a UDP packet). The source port address of the packet 400 may be modified to include a routing value (e.g., may be changed from a default value to the routing value) generated based on the source address (and/or other fields/values such as the source port, the destination address, the destination port, the payload, etc.) of the IP packet.

Figure 5:
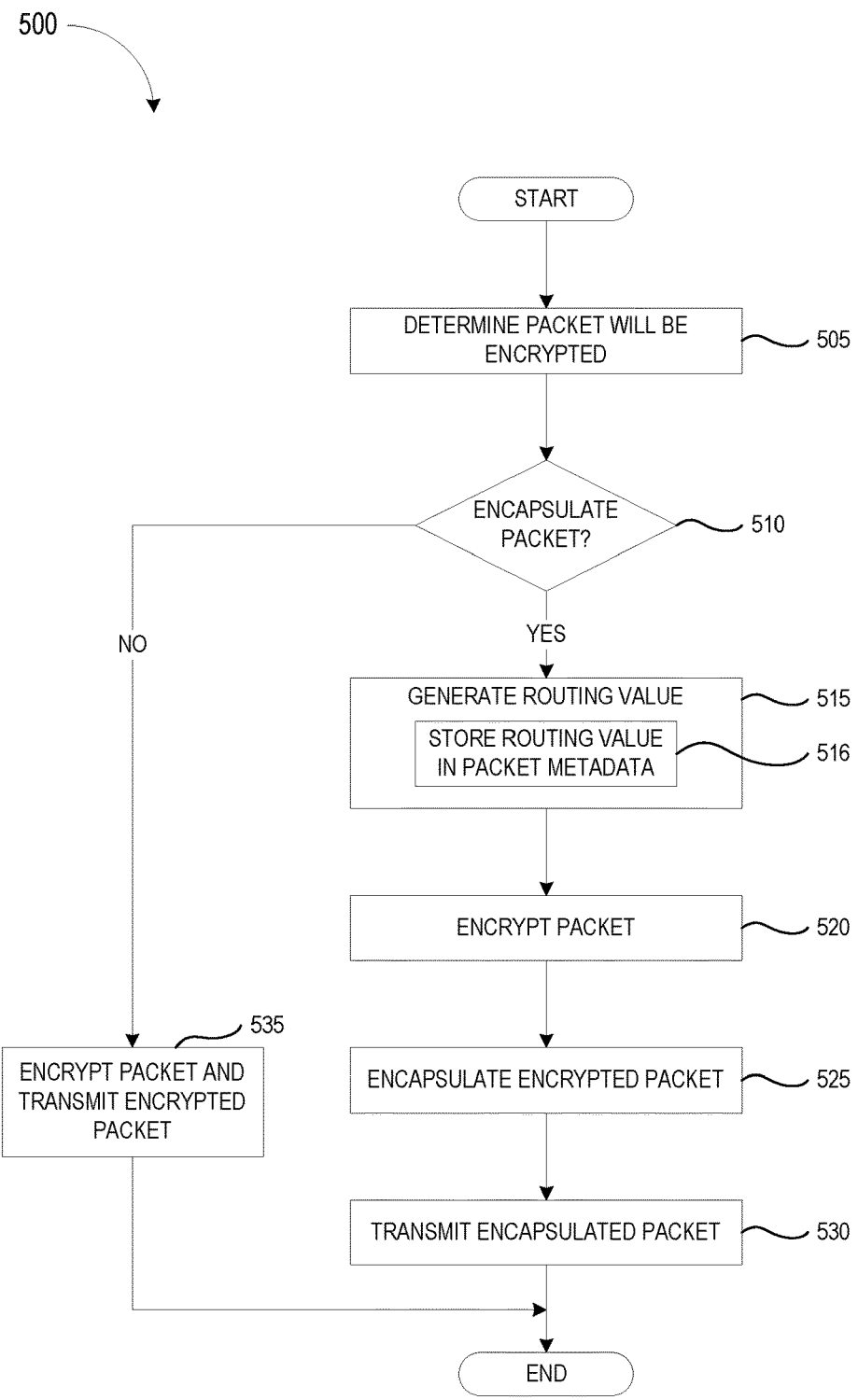
FIG. 5 is a flow diagram of a method for transmitting packets in a network in accordance with some embodiments.

FIG. 5 is a flow diagram of a method 500 for transmitting packets in a network in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a router (e.g., router 110a illustrated in FIG. 1, router 110 illustrated in FIG. 2), a routing component (e.g., routing component 111a illustrated in FIG. 1, routing component 111 illustrated FIG. 2), and/or a processing core (e.g., processing core 215 illustrated in FIG. 2).

The method 500 begins at block 505 where the method 500 determines that a packet will be encrypted prior to transmitting a packet, as discussed above. For example, the method 500 may determine that the packet will be transmitted to another network/computing device via a secure communication channel (such as an IPsec communication channel). The packet may an unencrypted packet and may include a source address, as discussed above. At block 510, the method 500 determines whether the packet should be encapsulated (e.g., should be encapsulated in an encapsulating/outer packet after the packet is encrypted to generate an encrypted packet), as discussed above. For example, the method 500 may access a configuration setting (e.g., a setting or parameter in a configuration file) or may receive user input (e.g., user input from a network administration) indicating that the packet should be encapsulated. In one embodiment, the method 500 may mark or flag the packet as a packet that will be encapsulated. For example, each packet may be associated with a data structure when the packet is received. The method 500 may include and/or update a field, flag, parameters, values, etc., within the data structure to indicate that the packet (associated with the data structure) should be encapsulated. In one embodiment, a Linux OS may be used and the data structure may be socket buffer (SKB) data structure. The method may use the iptables module of the Linux operating system to mark the packet for encapsulation (e.g., to update the data structure associated with the packet).

If the packet should be encapsulated, the method 500 may generate a routing value based on the source address of the packet (e.g., the unencrypted packet) at block 515, as discussed above. For example, the routing value may be a hash value and the method 500 may provide the source address as an input to a hashing function/algorithm to generate the hash value. In one embodiment, the method 500 may use the skb_hash_get function (that may be included as part of the Linux OS) to generate the routing value. As discussed above, different flows of packets may be transmitted by different computing devices and/or applications with different source addresses. Thus, the routing values for the different flows of packets may be different which allows the different flows to be provided to different processing cores (for processing) by the receiving network device (e.g., by the receiving router). In other embodiments, the routing value may be based on multiple portions of the packet (e.g., may be based on one or more of the source address, source port, destination address, destination port, payload, etc., of the packet). For example, the routing value may be based on the source address and the destination address. In another example, the routing value may be based on the source address, the source port, and a portion of the payload. In a further example, the routing value may be based on the source address, the source port, the destination address, and the destination port. At block 516, the method 500 may store the routing value in the data structure associated with the packet so that the routing value may be used when encapsulating the packet. For example, the routing value may be stored in the SKB data structure associated with the packet. This allows the routing value to remain accessible after the packet has been encrypted. In some embodiments, block 516 may be optional. For example, if data structures are not associated with the packets and/or used, block 516 may not be performed.

At block 520, the method 500 may encrypt the packet (e.g., encrypt the unencrypted packet) to generate an encrypted packet, as discussed above. For example, the method 500 may encrypt the packet to generate an IPsec packet. In one embodiment, the method 500 may use the XFRM modules of the Linux OS to encrypt the packet. The method 500 may encapsulated the encrypted packet within an encapsulating packet or outer packet at block 525, as discussed above. For example, the method 500 may encapsulate the encrypted packet with a UDP packet or within an NAT-T packet. In one embodiment, the method 500 may use the XFRM modules of the Linux OS to encapsulate the encrypted packet. As discussed above, encrypting the packet (to generate the encrypted packet) may prevent the source from being accessed (e.g., from being read). The method 500 may also use the routing value that is stored in the data structure (e.g., the SKB data structure) to change the source port of the encapsulating packet from a default value (e.g., 4500) to the routing value at block 525, as discussed above. At block 530, the method 500 may transmit the encapsulating packet to another networking device and/or computing device (e.g., to the next hop), as discussed above.

If the packet should not be encapsulated, the method 500 may encrypt the packet and may transmit the encrypted packet to another networking device and/or computing device (e.g., to the next hop) at block 535, as discussed above.

Figure 6:
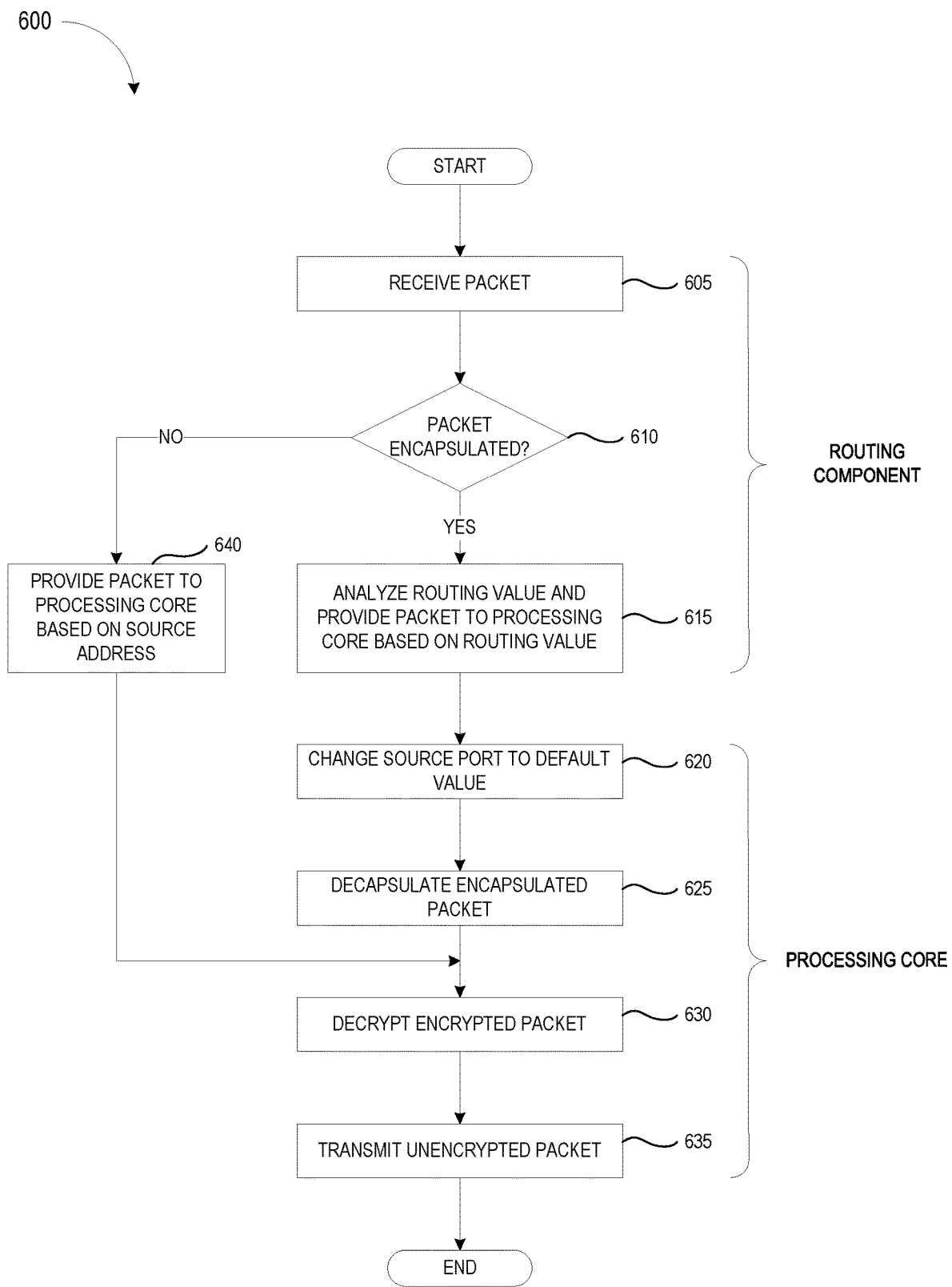
FIG. 6 is a flow diagram of a method for receiving packets in a network in accordance with some embodiments.

FIG. 6 is a flow diagram of a method for receiving packets in a network in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a router (e.g., router 110b illustrated in FIG. 1, router 110 illustrated in FIG. 2), a routing component (e.g., routing component 111b illustrated in FIG. 1, routing component 111 illustrated FIG. 2), and/or a processing core (e.g., processing core 215 illustrated in FIG. 2).

The method 600 begins at block 605 where the method 600 receives a packet. At block 610, the method 600 determines whether the packet is an encapsulating packet, as discussed above. For example, the method 600 may determine whether the packet is a UDP packet or a NAT-T packet. If the packet is an encapsulating packet, the method 600 may obtain a routing value by accessing the source port of the encapsulating packet and may analyze the routing value at block 615. The method 600 may determine which of a plurality of processing cores should be used to process the encapsulating packet (and/or the encrypted packet within the encapsulating packet) based on the routing value, as discussed above. For example, the method 600 may map different routing values to different processing cores.

At block 620, the method 600 may change the source port from the routing value, back to a default value. For example, the method 600 may change the source port from the routing value back to a default value of 4500. In some embodiments, block 620 may be optional. For example, the method 600 may not change the source port from the routing value back to the default value and may proceed to block 625. At block 625, the method 600 may decapsulate an encrypted packet (e.g., an IPsec packet) from the encapsulating packet, as discussed above. In one embodiment, the method 600 may use the XFRM modules of the Linux OS to decapsulate the encrypted packet. The method 600 may decrypt the encrypted packet to generate an unencrypted packet at block 630, as discussed above. In one embodiment, the method 600 may use the XFRM modules of the Linux OS to decrypt the encrypted packet. At block 635, the method 600 may transmit the unencrypted packet to another networking device and/or computing device (e.g., to the next hop), as discussed above.

If the packet is not an encapsulated packet, the method 500 may provide the packet (which may be an encrypted packet, such as an IPsec packet) to a processing core based on the source address of the encrypted packet, at block 640.

As illustrated in FIG. 6, different portions of the method 600 may be performed by different processing logic. For example, blocks 605, 610, 615, and 640 may be performed by a routing component. In another example, blocks 620, 625, 630, and 635 may be performed by a processing core.

Figure 7:
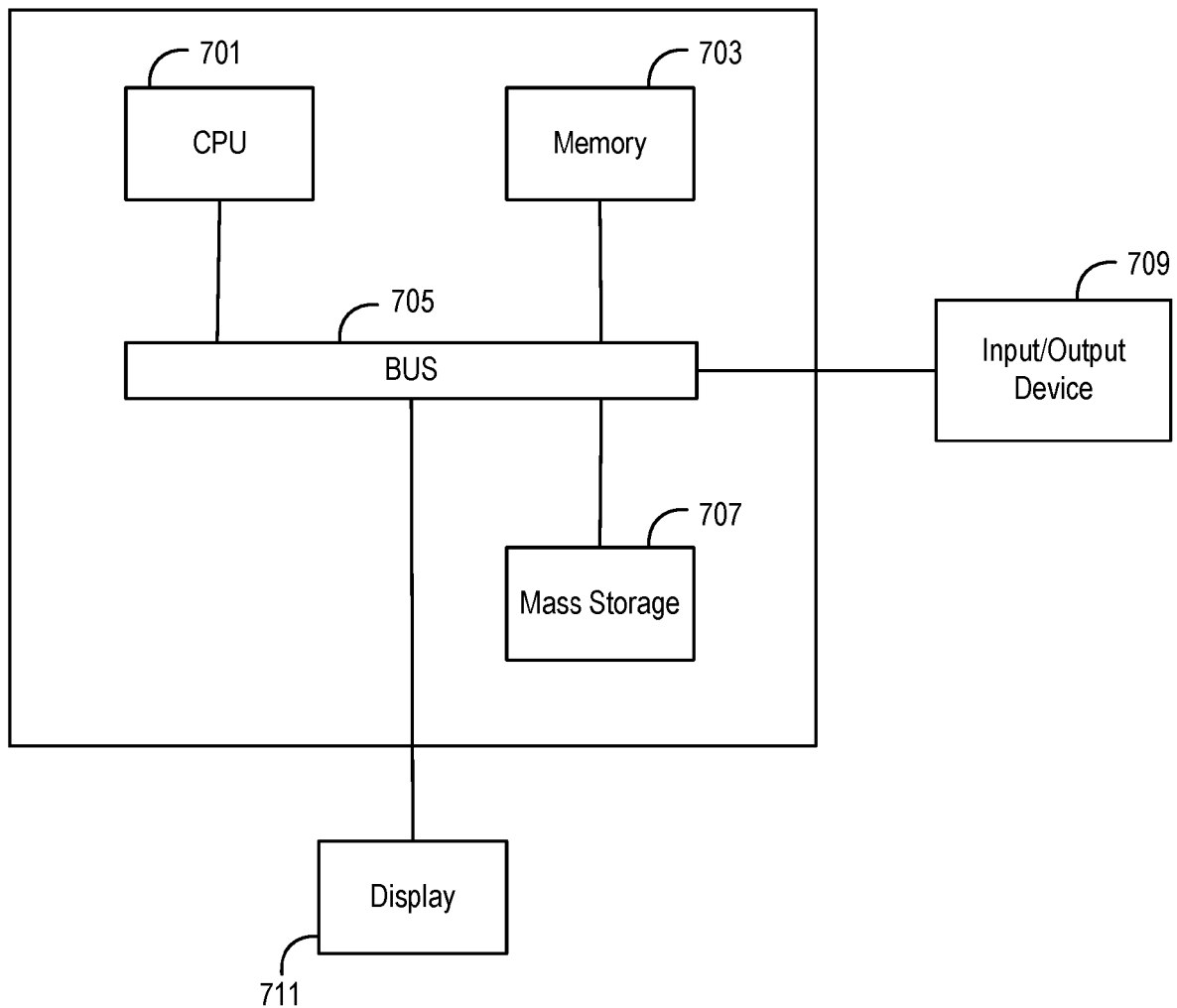
FIG. 7 is an illustration showing an exemplary computing device which may implement the embodiments described herein.

FIG. 7 is an illustration showing an exemplary computing device which may implement the embodiments described herein. The computing device of FIG. 7 may be used to perform embodiments of the functionality for consistent hashing and routing of network packets in accordance with some embodiments. The computing device includes a central processing unit (CPU) 701, which is coupled through a bus 705 to a memory 703, and mass storage device 707. Mass storage device 707 represents a persistent data storage device such as a floppy disc drive or a fixed disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein to enable the functionality described with reference to FIGS. 1-6. The code embodying this functionality may be stored within memory 703 or mass storage device 707 for execution by a processor such as CPU 701 in some embodiments. The operating system on the computing device may be iOS™, MS-WINDOWS™, OS/2™, UNIX™, LINUX™, or other known operating systems. It should be appreciated that the embodiments described herein may also be integrated with a virtualized computing system implemented with physical computing resources. Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. In addition, the term "set" includes a set with one or more items and/or elements within the set. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

It should be appreciated that the methods described herein may be performed with a digital processing system, such as a conventional, general-purpose computer system. Special purpose computers, which are designed or programmed to perform only one function may be used in the alternative.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of encapsulating encrypted packets to allow a network device to parallel process packets from different flows, comprising:
    determining that a first packet will be encrypted prior to transmitting the first packet to the network device, wherein the first packet comprises a first source address for the first packet;
    generating a routing value based on one or more of the first source address, a source port, a destination address, a destination port, or payload of the first packet, wherein the routing value allows the network device to determine which of a plurality of processing cores will be used to process the first packet, wherein the determination allows the network device to parallelize the processing of different flows by distributing packets from a first flow to a first processing core and packets from a second flow to a second processing core;
    encrypting the first packet to generate an encrypted first packet;
    encapsulating the encrypted first packet within a second packet, wherein a payload of the second packet comprises the encrypted first packet and wherein a packet header of the second packet comprises the routing value, wherein the first source address is encrypted as part of the encrypted first packet, and encrypting the first packet within the second packet prevents the network device from using the first source address, and the routing value is used by the network device to distribute the second packet to a determined processing core for processing by the determined processing core; and transmitting the second packet to the network device.

2. The method of claim 1, wherein the packet header of the second packet comprises a source port and wherein the source port comprises the routing value.

3. The method of claim 2, further comprising:
replacing a default value of the source port with the routing value.

4. The method of claim 1, wherein the routing value comprises a hash value and wherein generating the routing value comprises:
generating the hash value based on a hashing function and the first source address.

5. The method of claim 1, wherein the encrypted first packet comprises an Internet Protocol Security (IPsec) packet.

6. The method of claim 1, wherein the second packet comprises a Generic Routing Encapsulation (GRE) packet.

7. The method of claim 1, wherein the second packet comprises a User Datagram Protocol (UDP) packet.

8. The method of claim 1, further comprising:
receiving the first packet via an ingress member, wherein the second packet is transmitted via an egress member.

9. The method of claim 1, further comprising:
determining whether the encrypted first packet will be encapsulated; and
transmitting the encrypted first packet to the network device in response to determining that the encrypted first packet will not be encapsulated.

10. An apparatus for encapsulating encrypted packets to allow a network device to parallel process packets from different flows, comprising:
a hardware memory configured to store a plurality of packets; and
a routing component coupled to the hardware memory, the routing component configured to:
determine that a first packet will be encrypted prior to transmitting the first packet to a network device, wherein the first packet comprises a first source address for the first packet;
generate a routing value based on one or more of the first source address, a source port, a destination address, a destination port, or payload of the first packet, wherein the routing value allows the network device to determine which of a plurality of processing cores will be used to process the first packet, wherein the determination allows the network device to parallelize the processing of different flows by distributing packets from a first flow to a first processing core and packets from a second flow to a second processing core;
encrypt the first packet to generate an encrypted first packet;
encapsulate the encrypted first packet within a second packet, wherein:
a payload of the second packet comprises the encrypted first packet; and
a packet header of the second packet comprises the routing value, wherein the first source address is encrypted as part of the encrypted first packet, and encrypting the first packet within the second packet prevents the network device from using the first source address, and the routing value is used by the network device to distribute the second packet to a determined processing core for processing by the determined processing core; and
transmit the second packet to the network device.

11. The apparatus of claim 10, wherein the packet header of the second packet comprises a source port and wherein the source port comprises the routing value.

12. The apparatus of claim 11, wherein the routing component is further configured to: replace a default value of the source port with the routing value.

13. The apparatus of claim 10, wherein the routing value comprises a hash value and wherein to generate the routing value the routing component is further configured to:
generate the hash value based on a hashing function and the first source address.

14. The apparatus of claim 10, wherein the routing component is further configured to: determine whether the encrypted first packet will be encapsulated; and
transmit the encrypted first packet to the network device in response to determine that the encrypted first packet will not be encapsulated.

15. A method of parallel processing packets from different flows in a network environment, comprising:
receiving a first packet, wherein a first packet header of the first packet comprises a routing value, wherein the first packet comprises an encrypted second packet, wherein a source address of the encrypted second packet is encrypted as part of the encrypted second packet and wherein the routing value is based on one or more of a source address, a source port, a destination address, a destination port, or payload of the encrypted second packet;
identifying a first processing core of a plurality of processing cores based on the routing value, wherein the source address of the encrypted second packet is not used and the routing value is used by a network device to determine which of the plurality of processing cores will be used to process the first packet, wherein the determination allows the network device to parallelize the processing of different flows by distributing packets from a first flow to a first processing core and packets from a second flow to a second processing core; and
providing the first packet to the first processing core.

16. The method of claim 15, further comprising:
decapsulating, by the first processing core, the encrypted second packet;
decrypting, by the first processing core, the encrypted second packet to generate an unencrypted second packet; and
transmitting, by the first processing core, the unencrypted second packet to a network device or a computing device.

17. The method of claim 16, wherein:
the first packet header comprises a first source port;
the first source port comprises the routing value;
the unencrypted second packet comprises a second packet header; and
the second packet header comprises the source address.

18. The method of claim 15, wherein:
the source address is encrypted as part of the encrypted second packet; and
encrypting the source address prevents the source address from being used to determine which of the plurality of processing cores will be used to process the encrypted second packet.

* * * * *